United States Patent
Kato et al.

(10) Patent No.: US 7,758,466 B2
(45) Date of Patent: Jul. 20, 2010

(54) VEHICLE PLANETARY GEAR DEVICE

(75) Inventors: Koichi Kato, Nishikamo-gun (JP); Akinori Homan, Toyota (JP); Hideki Tamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 125 days.

(21) Appl. No.: 12/073,439

(22) Filed: Mar. 5, 2008

(65) Prior Publication Data

US 2008/0220924 A1 Sep. 11, 2008

(30) Foreign Application Priority Data

Mar. 6, 2007 (JP) .............................. 2007-055399

(51) Int. Cl.
*F16H 48/06* (2006.01)
*F16H 57/08* (2006.01)

(52) U.S. Cl. ...................... 475/331; 475/248; 475/252

(58) Field of Classification Search ................ 475/331, 475/248, 249, 252
See application file for complete search history.

(56) References Cited

U.S. PATENT DOCUMENTS

| | | | | |
|---|---|---|---|---|
| 4,157,668 A | * | 6/1979 | Fukuma et al. | ............. 475/159 |
| 6,422,971 B1 | * | 7/2002 | Katou et al. | ................. 475/331 |
| 6,743,148 B2 | * | 6/2004 | Hayabuchi et al. | .......... 475/331 |
| 6,866,607 B2 | * | 3/2005 | Nishiji et al. | ................ 475/331 |
| 7,104,913 B2 | * | 9/2006 | Yoshiyama et al. | .......... 475/248 |

FOREIGN PATENT DOCUMENTS

| | | |
|---|---|---|
| JP | A-09-112657 | 5/1997 |
| JP | A-2002-089659 | 3/2002 |
| JP | A-2002-195383 | 7/2002 |
| JP | A-2002-349670 | 12/2002 |
| JP | A-2003-314664 | 11/2003 |
| JP | A-2004-347011 | 12/2004 |

\* cited by examiner

*Primary Examiner*—Tisha D Lewis
(74) *Attorney, Agent, or Firm*—Oliff & Berridge, PLC

(57) ABSTRACT

A vehicle planetary gear device includes a ring gear, a sun gear, and a carrier, and pinions housed in the carrier. A penetration hole formed in a hollow cylindrical portion of the carrier has two inner wall surfaces that face an outer peripheral surface of a pinion. One of the inner wall surfaces has a curvature radius larger than the radius of the pinion, and has a curvature center that is apart from the radius center of the pinion gear. The pinion is disposed with respect to the carrier with a predetermined space formed between the one of the inner wall surfaces and the outer peripheral surface of the pinion, and thereby slides along a radial direction of the carrier.

3 Claims, 6 Drawing Sheets

RELATED ART

FIG. 6B

RELATED ART

VEHICLE PLANETARY GEAR DEVICE

INCORPORATION BY REFERENCE

The disclosure of Japanese Patent Application No. 2007-055399 filed on Mar. 6, 2007 including the specification, drawings and abstract is incorporated herein by reference in its entirety.

BACKGROUND OF THE INVENTION

1. Field of the Invention

The invention relates to a vehicle planetary gear device.

2. Description of the Related Art

Figure 6A:
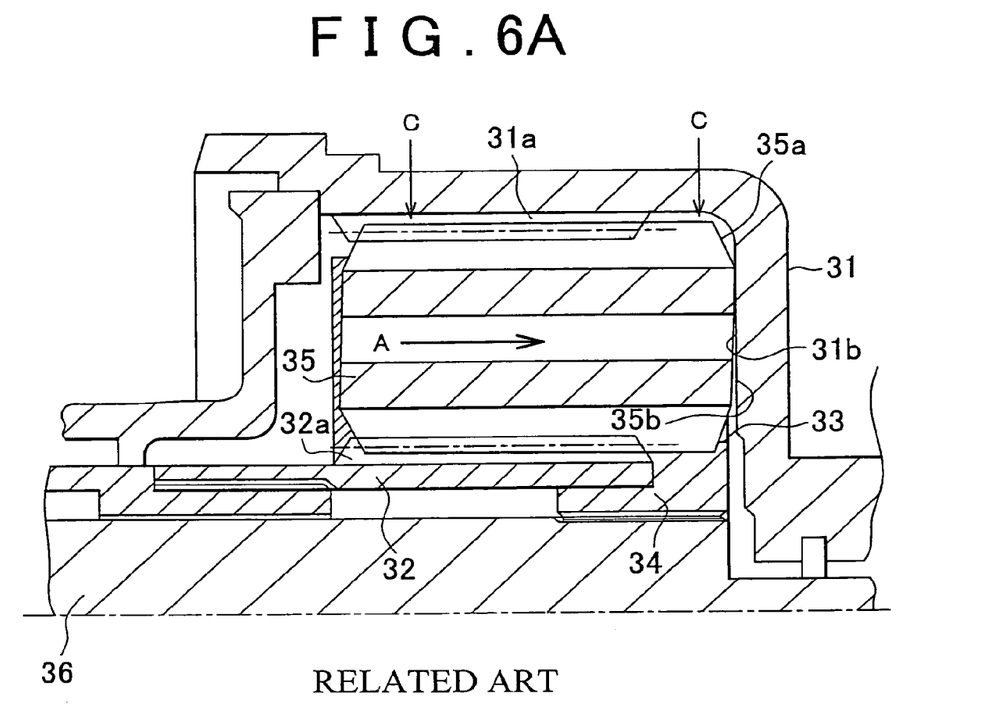
FIG. 6A is a partial sectional view of a related-art vehicle planetary gear device.

Generally, four-wheel drive vehicles are provided with a limited-slip differential (LSD)that has a planetary gear mechanism for a vehicle to lessen the rotation difference between the front wheels and the rear wheels if any rotation difference occurs. Typically, this type of vehicle planetary gear device is constructed of for example, as shown in FIG. 6A, a ring gear 31 that has a helical gear 31a on its inner peripheral surface; a sun gear 32 that has a helical gear 32a on its outer peripheral surface and that is disposed inside the ring gear 31 coaxially with the ring gear 31; a carrier 34 that is inserted between the ring gear 31 and the sun gear 32 coaxially with the ring gear 31 and the sun gear 32 and that has a hollow cylindrical portion provided with penetration holes 33 penetrating the hollow cylindrical portion along radial directions; and pinions 35 that are housed in the penetration holes 33 of the carrier 34 so as to be freely rotatable and be slidable in the axis direction and that has a helical gear 35a on its outer peripheral surface to mesh with the ring gear 31 and the sun gear 32.

In a planetary gear device as described above, when the front and rear wheels are rotating at the same rotation speed, that is, when there is no rotation difference between the front and rear wheels, the torque output from the engine is input to the carrier 34 via the input shaft 36. Then, with a predetermined torque distribution ratio, a certain torque is output to the front wheel side from the pinions 35 via the sun gear 32 while a certain torque is output to the rear wheel side from the pinions 35 via the ring gear 31. On the other hand, when a rotation difference occurs between the front and rear wheels, a rotation difference occurs between the sun gear 32 linked to the front wheel side and the ring gear 31 linked to the rear wheel side. In consequence, since the ring gear 31 and the pinions 35 are formed with helical gears, a thrust force shown by an arrow A in FIG. 6A is generated in the axis direction of the pinions 35. Due to this thrust force, the pinions 35 slide in the direction of the arrow A within the penetration holes 33 of the carrier 34, and thereby press the ring gear 31 since an end surface 35b of each pinion 35 contacts an inner wall surface 31b of the ring gear 31. Due to this pressing action, friction force on the contact portions between the end surfaces 35b of the pinions 35 and the inner wall surface 31b of the ring gear 31 is generated, and thereby the pinions 35 and the ring gear 31 are engaged. Therefore, the front wheel side linked to the pinions 35 via the sun gear 32 and the rear wheel side linked to the ring gear 31 become engaged. In consequence, another torque distribution that is different from the torque distribution occurring when the front and rear wheels are rotating at the same rotation speed is achieved such that the rotation difference between the front and rear wheels are lessened.

In this type of planetary gear device, when the rotation of the input shaft 36 is transmitted to the carrier 34, the pinions 35 provided in the penetration holes 33 of the carrier 34 revolve together with the carrier 34, and the pinions 35 press a inner wall of the carrier 34 since the outer peripheral surfaces of the pinions 35 contact inner wall surfaces 33a, 33b of the penetration holes 33. Due to this pressing action, concentrated stress, that is, so-called "Hertz stress", is caused in the contact portions by the contact surface pressure. Due to the Hertz stress, friction is generated on the contact portions between the inner wall surfaces 33a, 33b of the penetration holes 33 and the outer peripheral surfaces of the pinions 35, and therefore the contact portions are likely to abrade.

In order lessen the abrasion of the contact portions, for example, Japanese Patent Application Publication No. 2003-314664 (hereinafter, JP-A-2003-314664) describes a vehicle planetary gear device in which the inner wall surfaces 33a, 33b of the penetration holes 33 are each formed by an arc plane whose curvature radius is same as the radius of the outer peripheral circle of each pinion 35. Therefore, the area of the contact portions at the time of contact between the outer peripheral surfaces of the pinions 35 and the inner wall surfaces 33a, 33b of the penetration holes 33 is enlarged, and therefore the contact surface pressure is decreased. Thus, the abrasion of the contact portions is reduced.

Figure 6B:
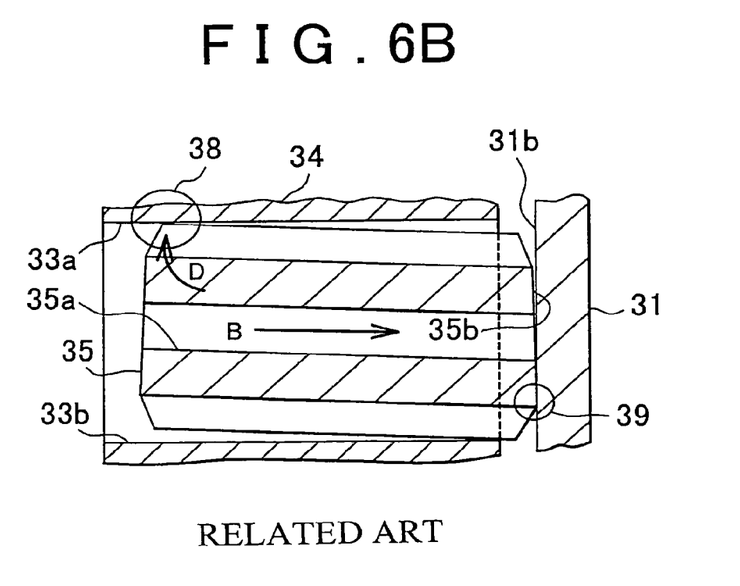
FIG. 6B is a plan view taken in the C-C direction in FIG. 6A, showing a state in which the pinion housed in the penetration hole of the carrier is in contact with an inner wall surface of a ring gear.

However, in the planetary gear device of JP-A-2003-314664, dimensions of the penetration holes 33, the pinions 35 and other component parts of the planetary gear device vary within the ranges of permissible dimensional error. In the case where such dimensional variations have accumulated when the inner wall surfaces 33a, 33b of the penetration holes 33 formed by arc planes whose curvature radius is same to the radius of the outer peripheral circle of each pinion 35, biased contact portions 38 may be formed between the inner wall surfaces 33a, 33b of the penetration holes 33 and the outer peripheral surfaces of the pinions 35 as shown in FIG. 6B. If such biased contact portions 38 are formed, the area of those contact portions lessens and the contact surface pressure heightens. In consequence, the abrasion of the contact portions becomes large. Incidentally, the "biased contact" refers to a type of contact by which the components parts whose evenly contact each other in the predetermined regions under a normal condition is caused to locally contact each other and thereby the surface pressure on the contact portions heightens due to accumulated dimensional errors of the component parts or the like.

Furthermore, biased contact portions 39 may be also formed between the end surfaces 35b of the pinions 35 and the inner wall surface 31b of the ring gear 31. If such a biased contact portion 39 is formed, the thrust force that occurs in the direction of the arrow B in FIG. 6B at the time of the differential control causes a moment force about the biased contact portion serving as a fulcrum to act in a direction orthogonal to the axis direction of the pinion 35. This moment force acts in the direction of an arrow D to press the outer peripheral surface of the pinion 35 against the inner wall surface of the penetration hole 33, and therefore further heightens the contact surface pressure on the biased contact portion 38, giving rise to problems of the abrasion of the contact portion becoming large and the production of noise from the contact portion being difficult to restrain.

SUMMARY OF THE INVENTION

The invention provides a vehicle planetary gear device that decreases the contact surface pressure on contact portions between the outer peripheral surfaces of the pinions and the inner wall surfaces of the penetration holes of the carrier and therefore reduces the abrasion thereof and restraining the production of noise.

A vehicle planetary gear device in accordance with a first aspect of the invention includes: a ring gear; a sun gear disposed inside the ring gear so that an axis of the sun gear coincides with an axis of the ring gear; a carrier that is inserted between the ring gear and the sun gear so that an axis of the carrier coincides with the axis of the ring gear and the sun gear and that has a hollow cylindrical portion provided with a penetration hole penetrating the hollow cylindrical portion along a radial direction; and a pinion that is housed in the penetration hole of the carrier so as to be freely rotatable and freely slidable in an axis direction of the pinion and that meshes with the ring gear and the sun gear. The penetration hole of the carrier has two inner wall surfaces that face an outer peripheral surface of the pinion, and at least one of the inner wall surfaces has a curvature radius larger than a radius of the pinion and a curvature center apart from a radius center of the pinion. The pinion is disposed with respect to the carrier so that a predetermined space is formed between the one of the inner wall surfaces and the outer peripheral surface of the pinion, and thereby slides along a radial direction of the carrier.

A vehicle planetary gear device in accordance with a second aspect of the invention includes: a ring gear, a sun gear disposed inside the ring gear so that an axis of the sun gear coincides with an axis of the ring gear, a carrier that is inserted between the ring gear and the sun gear so that an axis of the carrier coincides with the axis of the ring gear and the sun gear and that has a hollow cylindrical portion provided with a penetration hole penetrating the hollow cylindrical portion along a radial direction; and a pinion that is housed in the penetration hole of the carrier so as to be freely rotatable and freely slidable in an axis direction of the pinion and that meshes with the ring gear and the sun gear. The penetration hole of the carrier has inner wall surfaces that face an outer peripheral surface of the pinion, and at least one of the inner wall surfaces is provided with a flat surface portion extending in the radial direction of the carrier. The pinion is disposed with respect to the carrier so that a predetermined space is formed between the one of the inner wall surfaces and the outer peripheral surface of the pinion, and thereby slides along a radial direction of the carrier.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention will be described hereinafter with reference to the drawings.

FIGS. 1 to 4 are diagrams showing a vehicle planetary gear device in accordance with a first embodiment of the invention. A planetary gear device in accordance with the invention constitutes, for example, a torque-sensing limited-slip differential device that improves the running performance of the vehicle by limiting the differential between the front wheels and the rear wheels if a difference in rotation speed occurs between the front wheels and the rear wheels.

Figure 1:
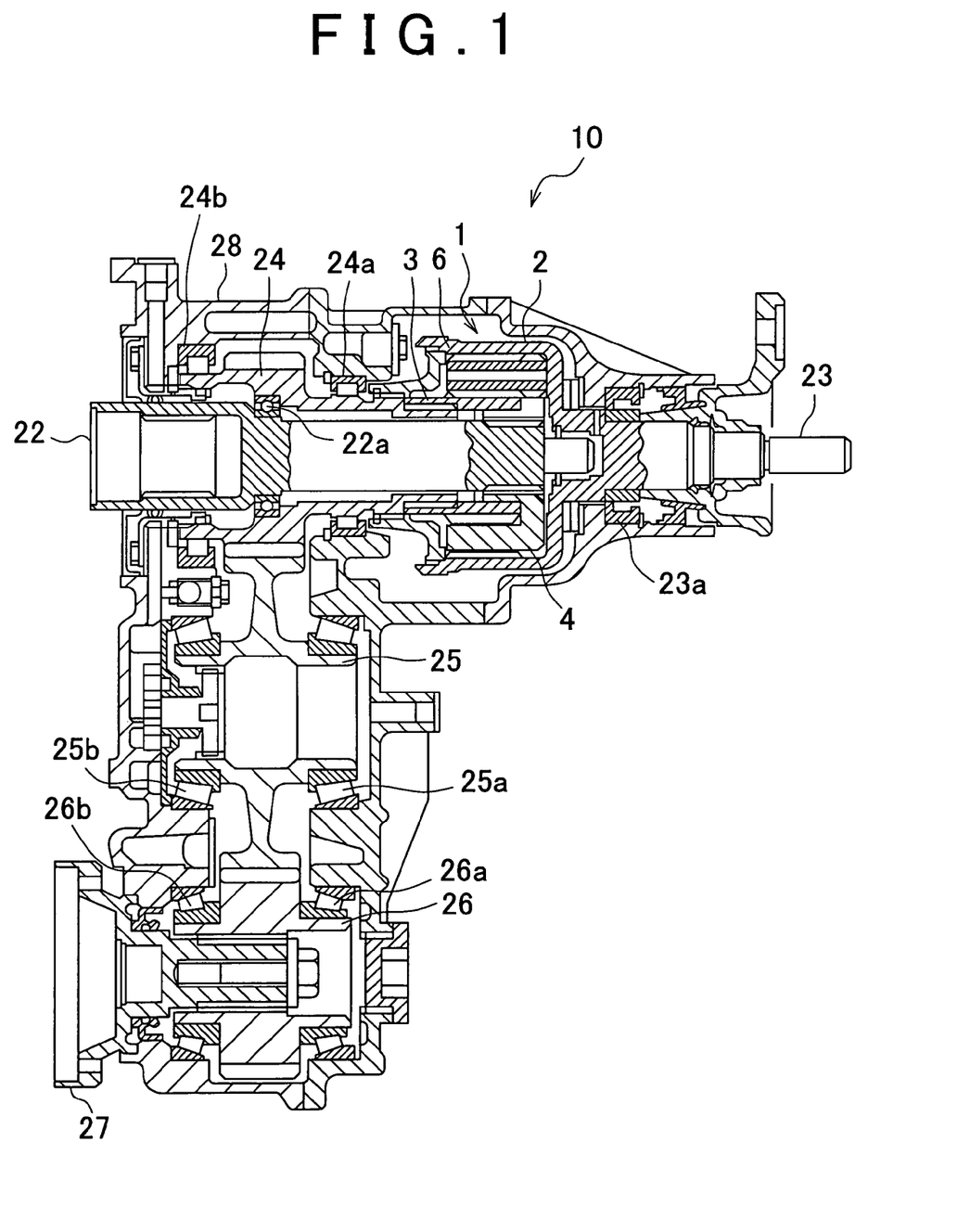
FIG. 1 is a sectional view of a limited-slip differential device of a vehicle in which a vehicle planetary gear device in accordance with a first embodiment of the invention is incorporated.
Figures 2A, 2B:
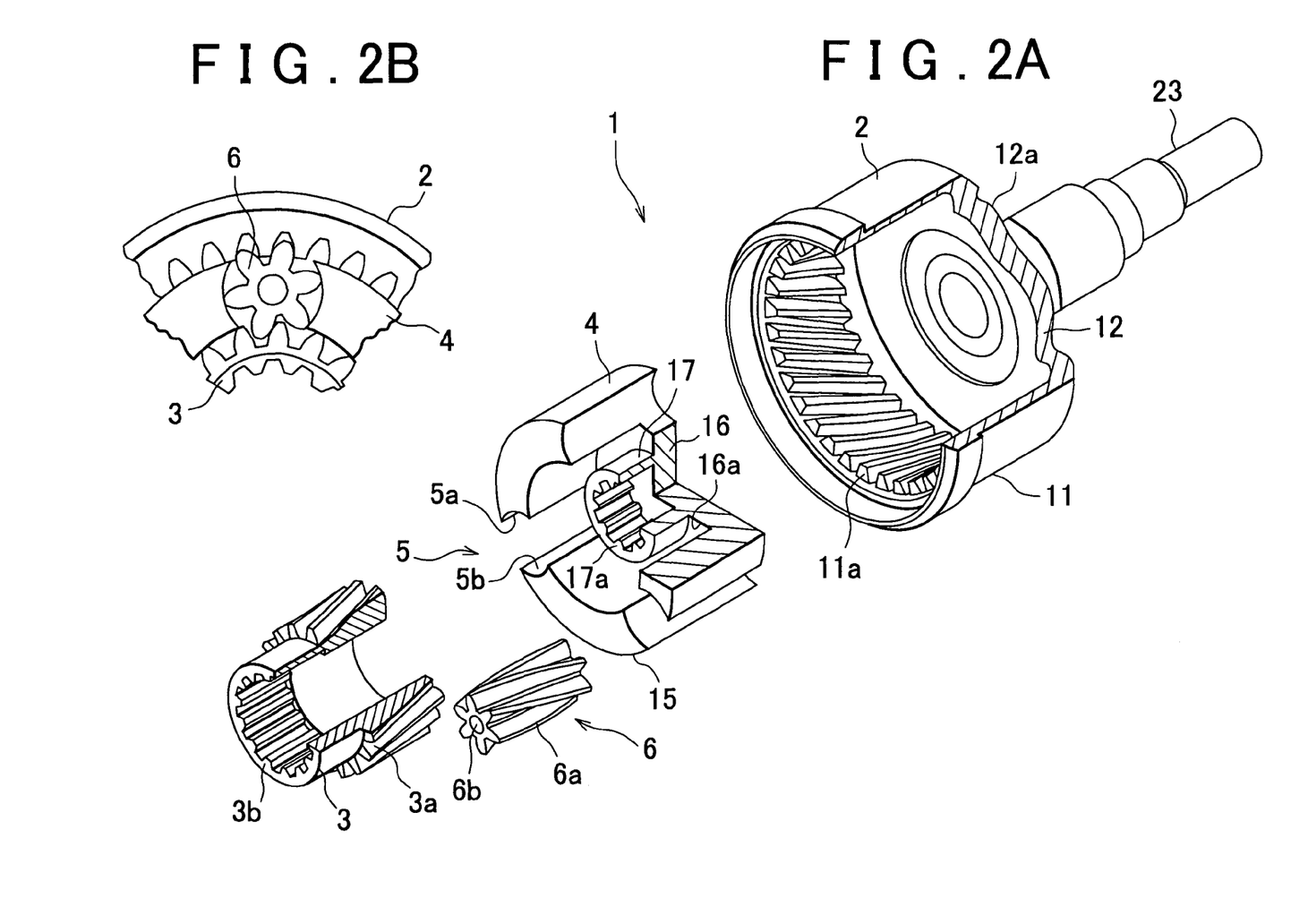
FIG. 2A is an exploded perspective view of a vehicle planetary gear device in accordance with an embodiment of the invention, in which a ring gear, pinions, a carrier and a sun gear are disassembled.
FIG. 2B is a partial side view of a vehicle planetary gear device in accordance with the first embodiment of the invention, showing a state in which the ring gear, the pinions, the carrier and the sun gear are intermeshed.

Firstly, the construction of a planetary gear device 1 will be described. The planetary gear device 1, as shown in FIGS. 1, 2A and 2B, is constructed of a ring gear 2 that has, on its inside, helical teeth, a sun gear 3 that is disposed inside the ring gear 2, with its axis coinciding with the axis of the ring gear 2 and that has, on its outside, helical teeth, a carrier 4 that is inserted between the ring gear 2 and the sun gear 3, with its axis coinciding with the axis of the ring gear 2 and the sun gear 3, and that has a hollow cylindrical portion 15 provided with penetration holes (pinion housing holes) 5 penetrating the hollow cylindrical portion 15 along radial directions, and pinions 6 that are housed in the penetration holes 5 of the carrier 4 so as to be freely rotatable and freely slidable in the axis direction and that has, on their outsides, helical teeth that mesh with the ring gear 2 and the sun gear 3. Although in the planetary gear device 1 in accordance with the embodiment of the invention, the ring gear 2, the sun gear 3 and the pinions 6 are provided with helical teeth, this is not restrictive. For example, at least one of the ring gear 2, sun gear 3 and pinions 6 may be formed with spur teeth, and may be meshed with other gears having the helical teeth in combination.

Furthermore, a limited-slip differential device 10 that has the planetary gear device 1, as shown in FIG. 1, is constructed of an input shaft 22 that has a splint on an end portion thereof, a rear output shaft 23, a drive gear 24 that has a spline on one end portion thereof and has external gear teeth on the other end portion, an idler gear 25 that has external gear teeth, a driven gear 26 whose hollow cylindrical body has a spline on an inner peripheral portion thereof and has external gear teeth on an outer peripheral portion thereof, and a front output shaft 27 that has a spline on an end portion thereof.

The input shaft 22 and a housing 28 are freely rotatably interlinked by a bearing 22a that is provided between the input shaft 22 and the housing 28. The rear output shaft 23 and the housing 28 are freely rotatably interlinked by a bearing 23a that is provided between the rear output shaft 23 and the housing 28. The drive gear 24 and the housing 28 are freely rotatably interlinked by bearings 24a, 24b that are provided between the drive gear 24 and the housing 28. The idler gear 25 and the housing 28 are freely rotatably interlinked by bearings 25a, 25b that are provided between the idler gear 25 and the housing 28. The driven gear 26 and the housing 28 are freely rotatably interlinked by bearings 26a, 26b that are provided between the driven gear 26 and the housing 28. The front output shaft 27 and the housing 28 are freely rotatably interlinked by a bearing 27a that is provided between the front output shaft 27 and the housing 28.

The ring gear 2, as shown in FIG. 2A, is constructed of a hollow cylindrical portion 11 and a bottom portion 12 that is formed integrally with the hollow cylindrical portion 11. The hollow cylindrical portion 11 is provided with a helical internal gear 11a having a predetermined number of teeth which is protruded from an inner wall surface of the hollow cylindrical portion 11. The bottom portion 12 is formed integrally with the rear output shaft 23 protruding from an outer surface 12a so that the axis of the rear output shaft 23 and the axis of the hollow cylindrical portion 11 are aligned on the same straight line. The sun gear 3 is formed by a hollow cylindrical body. An outer peripheral surface of an end portion of the sun gear 3 is provided with a helical external gear 3a having a predetermined number of teeth, and an inner wall surface of the other end portion is provided with a spline 3b.

Figure 3:
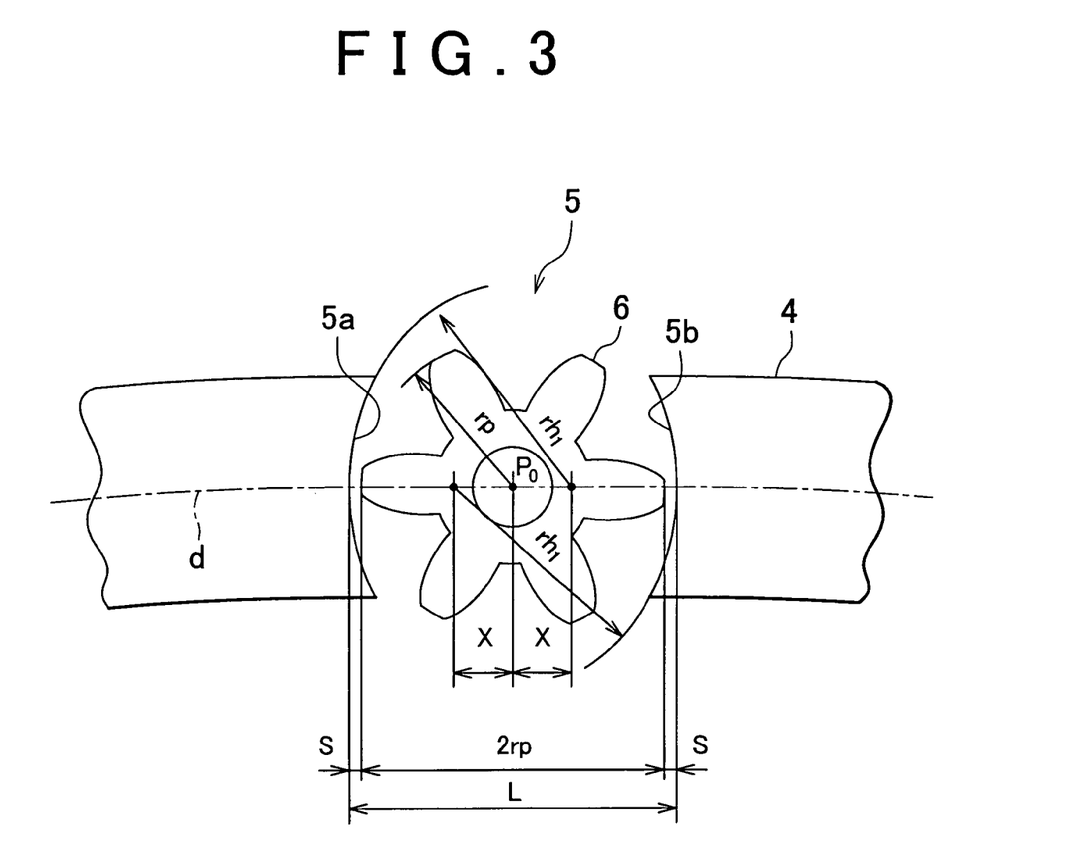
FIG. 3 is a partial side view of a vehicle planetary gear device in accordance with the first embodiment, showing a state in which a pinion is housed in a penetration hole whose inner wall surfaces have a curvature radius $rh_1$.

The carrier 4, as shown in FIG. 2A, is constructed of the hollow cylindrical portion 15, a bottom portion 16, and a boss portion 17. On the assumption of a circumference d located at the middle between the outer circumference and the inner circumference of the hollow cylindrical portion 15 in the radial directions, the hollow cylindrical portion 15 has three penetration holes 5 that have centers on the line of the circumference d as shown in FIG. 3 and that penetrate the hollow cylindrical portion 15 along radial directions. The three penetration holes 5 are equidistantly formed. Incidentally, the penetration holes 5 also penetrate the hollow cylindrical portion 15 in the axis direction of the pinions 6. The bottom portion 16 is formed integrally with the boss portion 17 protruding from an inner surface 16a of the bottom portion 16 so that the axis of the boss portion 17 and the axis of the hollow cylindrical portion 15 coincide with each other. An inner wall surface of the boss portion 17 is provided with a spline 17a.

Each of the penetration holes 5 of the carrier 4, as shown in FIG. 3, has inner wall surfaces 5a, 5b that face an outer peripheral surface of a corresponding one of the pinions 6. A center $P_0$ of each pinion 6 is positioned at a center of each hole 5. The inner wall surfaces 5a, 5b are formed facing each other with a predetermined distance L left between the intersection point of the circumference d of the hollow cylindrical portion 15 with the inner wall surface 5a and the intersection point of the circumference d of the hollow cylindrical portion 15 with the inner wall surface 5b. If "rp" is the radius from the center $P_0$ of each pinion 6 and "S" is each of the space defined between the outer peripheral surface of a pinion 6 and the inner wall surface 5a of a penetration hole 5 on the line of the circumference d of the hollow cylindrical portion 15 when the pinion 6 is housed in the penetration hole 5 and the space defined between the outer peripheral surface of the pinion 6 and the inner wall surface 5b of the penetration hole 5 on the line of the circumference d, the distance L between the inner wall surface 5a and the inner wall surface 5b on the line of the circumference d of the hollow cylindrical portion 15 is expressed by "2rp+2S".

This spaces S represent, in FIG. 3, the equal spaces that are defined between the inner wall surface 5a of the penetration hole 5 and the outer peripheral surface of the pinion 6 and between the inner wall surface 5b of the penetration hole S and the outer peripheral surface of the pinion 6. However, depending on the state of the rotation of the carrier 4 and each pinion 6, a space of 2S can be defined between the inner wall surface 5a and the outer peripheral surface of the pinion 6 or between the inner wall surface 5b and the outer peripheral surface of the pinion 6. The spaces S are filled with highly viscous lubricating oil, such as grease or the like, so that the pinions 6 and the carrier 4 are lubricated. Therefore, if a space for charging the lubricating oil into the spaces can be secured and the spaces are actually filled with the lubricating oil, the abrasion of the biased-contact portions can be further reduced.

As shown in FIG. 3, the inner wall surface 5a of each of the penetration holes 5 has a curvature radius $rh_1$ that is larger than the radius rp of the pinions 6, and the inner wall surface 5b thereof has the same curvature radius $rh_1$ as the inner wall surface 5a. Besides, each of the inner wall surface 5a and the inner wall surface 5b has a curvature center that is a distance X apart from the radius center $P_0$ of the pinion 6, on the line of the circumference d of the hollow cylindrical portion 15. The curvature radius herein refers to the radius of a circle that approximates a local state of curvature of a curved line.

Due to the spaces S between the pinions 6 and the inner wall surfaces 5a, 5b of the penetration holes S and the curvature radius $rh_1$ of the inner wall surfaces 5a, 5b, the pinions 6 can move within the penetration holes 5 in the radial directions and the circumferential direction of the hollow cylindrical portion 15. Specifically, each pinion 6 can freely move within the range of the space 2S in the direction of the circumference d of the hollow cylindrical portion 15, and can also freely move within a predetermined range in the radial directions. The predetermined range in the radial directions is defined by an interval obtained by combining the backlash formed between the helical gear 6a of each pinion 6 and the helical internal gear 11a of the ring gear 2 and the backlash formed between the helical external gear 6a of each pinion 6 and the helical external gear 3a of the sun gear 3.

Thus, the pinions 6 rotate about their own axes in the penetration holes 5, and revolve following the carrier 4. Incidentally, each pinion 6 can move within the range of the interval (i.e., backlash) defined between the ring gear 2 and the sun gear 3, and can move within the range of the space 2S. Therefore, if dimensional variations within the permissible ranges of dimensional error for component parts of the vehicle planetary gear device 1 have accumulated, the pinions 6 move in directions as mentioned above, so that the biased contact of the contact portions is avoided. This leads to a decrease in the moment force about the biased contact portion serving as a fulcrum which is caused by a thrust force that occurs on each pinion during the differential control, and therefore leads to a decline in the contact surface pressure on the contact portions between the outer peripheral surfaces of the pinions and the inner wall surfaces of the penetration holes. Therefore, the abrasion of the contact portions decreases, and the production of noise from the contact portions is restrained.

Each pinion 6, as shown in FIG. 2A, is formed by a hollow cylindrical body, and the outer peripheral surface thereof is provided with the protruded helical external gear 6a, and a penetration hole 6b for forming a lubricating oil passageway extends through the pinion 6 in the axis direction thereof.

The specifications of the helical internal gear 11a of the ring gear 2, the helical external gear 3a of the sun gear 3 and the helical external gear 6a of each pinion 6, such as the numbers of teeth thereof and the like, are determined according to the vehicle models, the torque distribution ratio between the front and rear wheels, and other conditions. For example, the number of teeth of the helical external gear 6a of each pinion 6 may be six, and the number of teeth of the helical internal gear 11a of the ring gear 2 may be forty, and the number of teeth of the helical external gear 3a of the sun gear 3 may be twenty. In this case, for example, if the sun gear 3 makes one turn clockwise, the ring gear 2 makes a half turn counterclockwise via the pinions 6.

The ring gear 2 is linked, at the bottom portion 12 thereof, to the rear output shaft 23 so that the axis of the ring gear 2 and the axis of the rear output shaft 23 coincide with each other, and is linked finally to the wheels via a differential (not shown). Besides, the carrier 4 is housed radially inside the hollow cylindrical portion 11 of the ring gear 2 so that the axis of the ring gear 2 and the axis of the carrier 4 coincide with each other and so that a predetermined space is left between the inner peripheral surface of the helical internal gear 11a and the outer peripheral surface of the carrier 4.

The sun gear 3 is linked by a spline interface to an end portion of the drive gear 24 so that the axis of the sun gear 3 and the axis of the drive gear 24 coincide with each other. Besides, the boss portion 17 of the carrier 4 is housed radially inside an end portion of the sun gear 3 so that the axis of the boss portion 17 and the axis of the sun gear 3 coincide with each other and so that a predetermined space is left between the outer peripheral surface of the boss portion 17 and the inner peripheral surface of the sun gear 3.

The drive gear 24 meshes with the idler gear 25, and the idler gear 25 meshes with the driven gear 26. The driven gear 26 is linked to the front output shaft 27 by a spline interface so that the axis of the driven gear 26 and the axis of the front output shaft 27 coincide with each other.

The carrier 4 is linked, at its boss portion 17, to a distal end portion of the input shaft 22 by a spline interface so that the axis of the carrier 4 and the axis of the input shaft 22 coincide with each other.

The pinions 6 are housed in the penetration holes 5 so that predetermined spaces are left between the inner wall surfaces 5a, 5b of the penetration holes 5 and the outer peripheral surfaces of the pinions 6. Incidentally, the pinions 6, as shown in FIG. 2B, mesh, on the radially outer side of the penetration holes 5, with the helical internal gear 11a of the ring gear 2, and mesh, on the radially inner side thereof, with the helical external gear 3a of the sun gear 3.

Figure 4A:
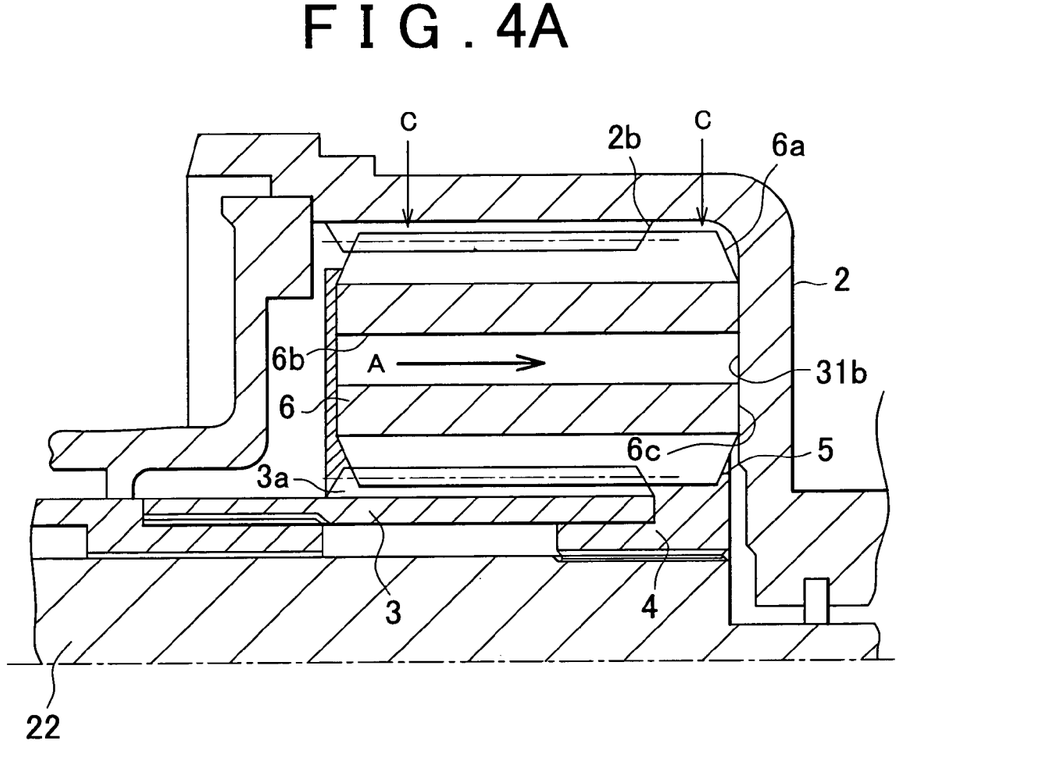
FIG. 4A is a partial sectional view of a vehicle planetary gear device in accordance with the first embodiment of the invention, showing a state in which the ring gear, the pinions, the sun gear are intermeshed.
Figure 4B:
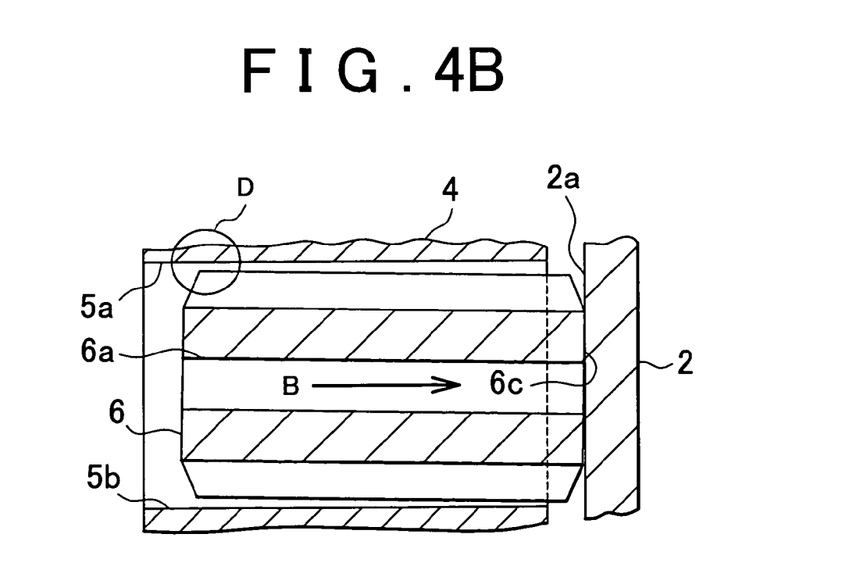
FIG. 4B is a plan view taken in the C-C direction in FIG. 4A, showing a state in which a pinion housed in a penetration hole of the carrier is in contact with an inner wall surface of the ring gear.

Due to this construction, as shown in FIG. 1, when the torque of the engine is input to the input shaft 22 and the input shaft 22 rotates, for example, clockwise, the carrier 4 rotates clockwise. As the carrier 4 rotates clockwise, the outer peripheral surface of each of the pinions 6 housed in the penetration holes 5 contacts the inner wall surface 5a, and each pinion 6 revolves about the axis of the carrier 4, following the rotation of the carrier 4. Simultaneously, the pinions 6 rotate counterclockwise about their own axes in the penetration holes 5. When the outer peripheral surfaces of the pinions 6 come into contact with the inner wall surfaces 5b of the penetration holes 5, the pinions 6 move in the circumferential direction of the hollow cylindrical portion 15 in the penetration holes 5, so that a space D is formed, as shown in FIG. 4B, between the outer peripheral surface of each pinion 6 and the inner wall surface 5a of the penetration hole 5. Even if, due to dimensional variations of component parts of the planetary gear device 1, the outer peripheral surface of each pinion 6 and the inner wall surface 5a contact each other without forming the aforementioned space, the contact surface pressure on the contact portion is remarkably reduced and the production of noise from the contact portion is restrained in this embodiment since the curvature center of the inner wall surface 5a is apart from the radius center $P_0$ of the pinion 6 by the distance X on the circumferential line of the hollow cylindrical portion 15 and the curvature radius $rh_1$ of the inner wall surface 5a is larger than the radius rp of the pinion 6.

Figure 5A:
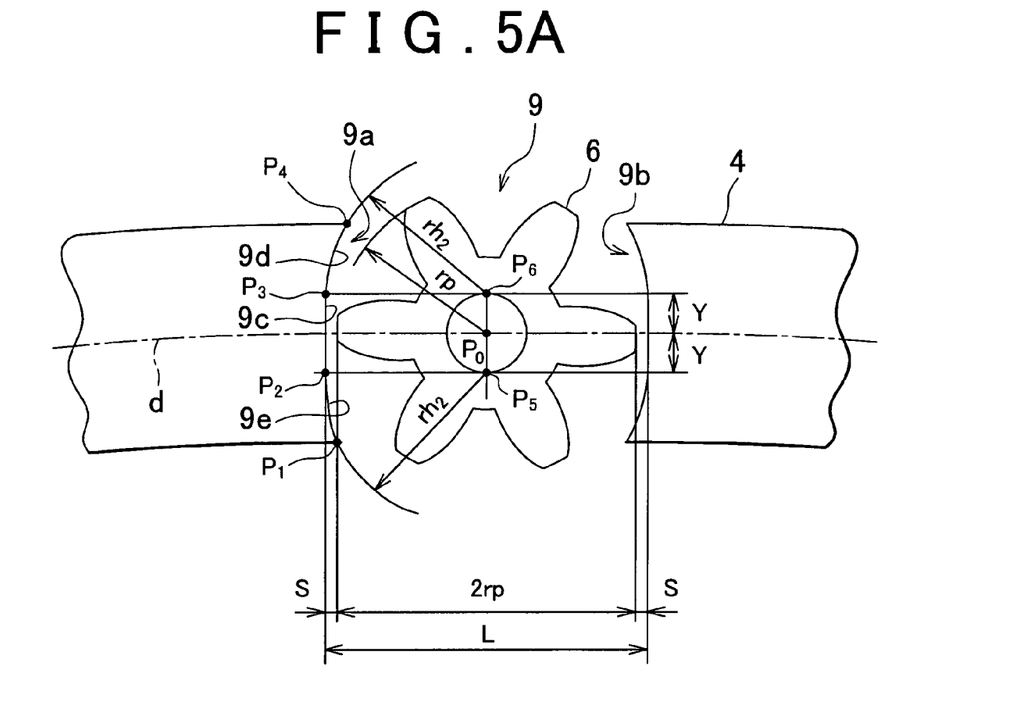
FIG. 5A is a partial side view of a vehicle planetary gear device in accordance with a second embodiment of the invention, showing a state in which a pinion is housed in a penetration hole of the carrier whose curved surface portions have a curvature radius of $rh_2$.
Figure 5B:
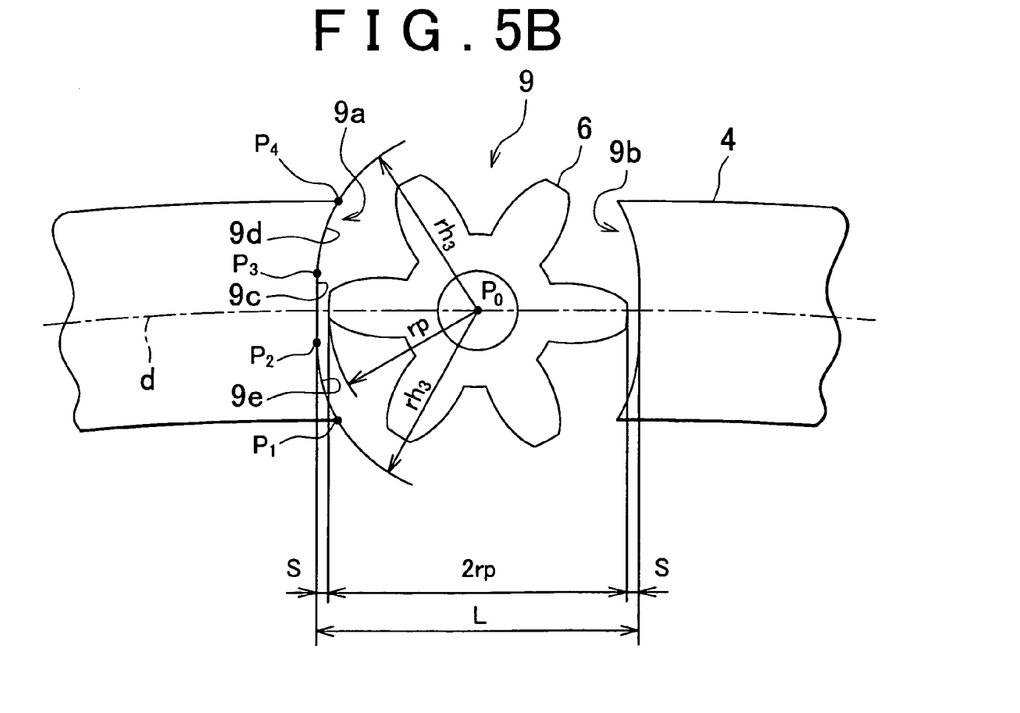
FIG. 5B shows a state in which a pinion is housed in a penetration hole of a carrier whose curved surface portions have a curvature radius of $rh_3$.

FIGS. 5A and 5B are partial side views of planetary gear devices in accordance with a second embodiment of the invention, each showing a state in which a pinion is housed in a penetration hole of a carrier.

The planetary gear device in accordance with the second embodiment is different from the device of the first embodiment in the shape of the penetration holes formed in the carrier, but other constructions are substantially the same. Therefore, the same constructions as in the first embodiment are assigned with the same reference numerals as those used in conjunction with the first embodiment shown in FIGS. 1 to 4, and detailed description will be given only about the differences.

As shown in FIGS. 5A and 5B, the penetration holes (i.e., pinion housing holes) 9 formed in the carrier 4 penetrate the wall of the carrier 4 in radial directions in substantially the same manner as in the first embodiment. Besides, the penetration holes 9 also penetrate the carrier 4 in the axis direction. Each of the penetration holes 9 of the carrier 4 has inner wall surfaces 9a, 9b that face the outer peripheral surface of a pinion 6. As in the first embodiment, the inner wall surfaces 9a, 9b are formed facing each other with a predetermined distance L left between the intersection point of the circumference d with the inner wall surface 9a and the intersection point of the circumference d with the inner wall surface 9b. This distance L is expressed by "2rp+S" where "rp" is the radius of the pinion 6 and "S" is each of the spaces defined between the outer peripheral surface of the pinion 6 and the inner wall surface 9a and between the outer peripheral surface of the pinion 6 and the inner wall surface 9b when the pinion 6 is housed in the penetration hole 9 so as to be on the line of the circumference d of the hollow cylindrical portion 15.

As shown in FIGS. 5A and 5B, the inner wall surface 9a of each penetration hole 9 is formed by a flat surface portion 9c, and a pair of curved surface portions, that is, a curved surface portion 9d extending radially outward from the flat surface portion 9c and a curved surface portion 9e radially inward from the flat surface portion 9c. The flat surface portion 9c, as shown in FIG. 5A, has a predetermined width 2Y (2Y=Y+Y), and extends between two end portions of the pinion 6 in the axis direction of the pinion 6. The predetermined width is the distance between an intersection point $P_2$ and an intersection point $P_3$ that are defined as follows. The intersection point $P_2$ represents a point at which a straight line extending parallel to the above-defined circumference d of the hollow cylindrical portion 15 and passing through a center $P_5$ located at a distance Y from the radius center $P_0$ of the pinion 6 in a radially inward direction of the hollow cylindrical portion 15 on a line orthogonal to the circumference d of the hollow cylindrical portion 15 intersects an arc of the curvature radius $rh_2$ about the center $P_5$. The intersection point $P_3$ represents a point at which a straight line extending parallel to the circumference d of the hollow cylindrical portion 15 and passing through a center $P_6$ located at the distance Y from the center $P_0$ in a radially outward direction on a line orthogonal to the circumference d intersects an arc of the curvature radius $rh_2$ about the center $P_6$. As for the predetermined width of the flat surface portion 9c formed by the distance 2Y, it suffices that the width be greater than the total of the backlash formed between the helical external gear 6a of the pinion 6 and the helical internal gear 11a of the ring gear 2 and the backlash formed between the helical external gear 6a of the pinion 6 and the helical external gear 3a of the sun gear 3. If this predetermined width is greater than the total of the two backlashes, the pinions 6 can freely move within the range of the distance of the total of the backlashes.

The curved surface portion 9d is formed by an arc of the curvature radius $rh_2$ about the center $P_6$ that extends between the intersection point $P_3$ and an edge portion $P_4$. The arc of the curved surface portion 9d and a straight line on the flat surface portion 9c are smoothly interconnected at the intersection point $P_3$. The curved surface portion 9e is formed by an arc of the curvature radius $rh_2$ about the center $P_5$ that extends between the intersection point $P_2$ and an edge portion $P_1$. The arc of the curved surface portion 9e and a straight line on the flat surface portion 9c are smoothly interconnected at the intersection point $P_2$.

It suffices that the inner wall surface 9b be formed by a flat surface portion and curved surface portions that are the same in shape as those of the inner wall surface 9a, and the inner wall surface 9b be formed facing the inner wall surface 9a. Besides, the inner wall surface 9b may also be formed facing the inner wall surface 9a, by a flat surface portion and curved surface portions that are different in shape from those of the inner wall surface 9a.

When the pinion 6 is housed in the penetration hole 9, a space S similar to the space S in the first embodiment is formed between the outer peripheral surface of the pinion 6 and each of the inner wall surfaces 9a, 9b. Depending on the state of rotation of the pinions 6 and the carrier, the space S may be defined between the outer peripheral surface of each pinion 6 and the inner wall surface 9a, or both between the outer peripheral surface of each pinion 6 and the inner wall surface 9a and between the outer peripheral surface of each pinion 6 and the inner wall surface 9b. The spaces S are filled with highly viscous lubricating oil, such as grease or the like, so that the pinions 6 and the carrier 4 are lubricated. Therefore, if a space for charging the lubricating oil into the spaces can be secured and the spaces are actually filled with the lubricating oil, the abrasion of the biased-contact portions can be further reduced.

Although the second embodiment has been described in conjunction with the case where the inner wall surfaces 9a, 9b of each penetration hole 9 are each formed by the flat surface portion 9c and the curved surface portions 9d, 9e, each of the inner wall surfaces 9a, 9b may also be formed only by a flat surface portion 9c. If the inner wall surfaces 9a, 9b of the penetration holes 9 are each formed only by a flat surface portion 9c, the radially outward opening and the radially inward opening of each penetration hole 9 become wider, so that the lubrication of the pinions 6 becomes better.

The foregoing construction, similar to the construction of the first embodiment, allows the pinions 6 to move in the radial directions and the direction of the axis in the penetration holes 9. As for the movements in the radial directions, each pinion 6 can move within the range of the space 2S in the direction of the circumference d of the carrier 4, and can move within a predetermined range in directions orthogonal to the circumference d of the carrier 4 (i.e., in the axis direction of the pinions 6). This predetermined range is defined by the total of the backlash formed between the helical external gear 6a of each pinion 6 and the helical internal gear 11a of the ring gear 2 and the backlash formed between the helical external gear 6a of each pinion 6 and the helical external gear 3a of the sun gear 3.

Thus, the pinions 6 rotate about their own axes in the penetration holes 9, and revolve following the carrier 4. Besides, each pinion 6 can move within the range of the interval defined between the ring gear 2 and the sun gear 3, and can move within the range of the space 2S. Therefore, if dimensional variations within the permissible ranges of dimensional error for component parts of the planetary gear device 1 have accumulated, the biased contact of the contact portions is avoided as the pinions 6 move in directions as mentioned above. This leads to a decrease in the moment force about the biased contact portion serving a fulcrum which is caused by a thrust force that occurs on each pinion during the differential control, and therefore leads to a decline in the contact surface pressure on the contact portions between the outer peripheral surfaces of the pinions and the inner wall surfaces of the penetration holes. Therefore, the abrasion of the contact portions decreases, and the production of noise from the contact portions is restrained.

Due to the construction of the vehicle planetary gear device 1 in accordance with the second embodiment, when the torque of the engine is input to the input shaft 22 and the input shaft 22 rotates, for example, clockwise, the carrier 4 rotates clockwise. As the carrier 4 rotates clockwise, the outer peripheral surface of each of the pinions 6 housed in the penetration holes 9 contacts the inner wall surface 9a, and each pinion 6 revolves about the axis of the carrier 4, following the rotation of the carrier 4. Simultaneously, the pinions 6 rotate counterclockwise about their own axes in the penetration holes 9. When the outer peripheral surfaces of the pinions 6 come into contact with the inner wall surfaces 9b of the penetration holes 9, the pinions 6 move within the penetration holes 9, so that a space D is formed, as shown in FIG. 4B, between the outer peripheral surface of each pinion 6 and the inner wall surface 9a of the penetration hole 9. Even if, due to dimensional variations of component parts of the planetary gear device 1, the outer peripheral surface of each pinion 6 and the inner wall surface 9a contact each other without forming the aforementioned space, the contact surface pressure on the contact portion is remarkably reduced and the production of noise from the contact portion is restrained in this embodiment since the inner wall surface 9a of each penetration hole 9 has a flat surface portion 9c that has a predetermined width (2Y) and since the curvature centers of the inner wall surface 9a are apart from the radius center $P_0$ of the pinion 6 by the distance Y in radial directions of the carrier 4.

Alternatively, as shown in FIG. 5B, the curved surface portion 9d may be formed by an arc of a curvature radius $rh_3$ about the center $P_0$ which extends between the intersection point $P_3$ and the edge portion $P_4$. The arc of the curved surface portion 9d and a straight line on the flat surface portion 9c are smoothly interconnected at the intersection point $P_3$. The curved surface portion 9e may be formed by an arc of the curvature radius $rh_3$ about the center $P_0$ that extends between the intersection point $P_2$ and the edge portion $P_1$. The arc of the curved surface portion 9e and a straight line on the flat surface portion 9c are smoothly interconnected at the intersection point $P_2$.

As described above, in the planetary gear device 1 in accordance with the invention, the penetration holes 5 of the carrier 4 each have the inner wall surfaces 5a, 5b that face the outer peripheral surface of the adjacent pinion 6, and each of the inner wall surfaces 5a, 5b of each penetration hole 5 has a curvature radius rh that is larger than the radius rp of the pinions 6, and curvature centers that are apart from each other, and the pinions 6 are disposed with respect to the carrier 4 so that the space S is formed between the outer peripheral surface of each pinion 6 and each of the inner wall surfaces 5a, 5b of the adjacent penetration hole 5. As a result, the following effect is achieved. That is, the biased contact caused by an error that is an accumulation of dimensional errors within ranges permitted for the component parts of the planetary gear device 1 is avoided and the area of contact between the pinions 6 and the ring gear 2 is enlarged, so that the contact surface pressure on the contact portions between the outer peripheral surfaces of the pinions 6 and the inner wall surfaces 5a, 5b of the penetration holes 5 can be decreased, and the abrasion of the outer peripheral surfaces of the pinions 6 and the inner wall surfaces 5a, 5b of the penetration holes 5 can be reduced, and the production of noise from the contact portions can be restrained. Therefore, the planetary gear device 1 of the invention may be applied to a wide variety of limited-slip differential devices, such as the torque-sensitive LSD, the helical LSD, and the Torsen LSD.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A vehicle planetary gear device comprising:
   an internal helical ring gear;
   an external helical sun gear disposed inside the ring gear so that an axis of the sun gear coincides with an axis of the ring gear;
   a carrier that is inserted between the ring gear and the sun gear so that an axis of the carrier coincides with the axis of the ring gear and the sun gear and that has a cylindrical portion provided with a penetration hole penetrating the cylindrical portion along a radial direction of the carrier; and
   an external helical pinion that is housed in the penetration hole of the carrier so as to be freely rotatable and slidable in an axis direction of the pinion and that meshes with the ring gear and the sun gear, wherein:
   the carrier has one inner wall surface and another inner wall surface, the one inner wall surface and the other inner wall surface facing an outer peripheral surface of the pinion;
   each of the one inner wall surface and the other inner wall surface is formed to have a curvature radius larger than a radius of the pinion;
   a curvature center of the one inner wall surface and a curvature center of the other inner wall surface are disposed on a circumference whose center is an axis center of the cylindrical portion, and which passes through a center of a width between an inner peripheral surface of the cylindrical portion and an outer peripheral surface of the cylindrical portion in the radial direction;
   the one inner wall surface and the other inner wall surface are disposed so that the curvature center of the one inner wall surface is apart from a center between the one inner wall surface and the other inner wall surface in a direction of the circumference, and is closer to the other inner wall surface than to the one inner wall surface, and the curvature center of the other inner wall surface is apart from the center between the one inner wall surface and the other inner wall surface in the direction of the circumference, and is closer to the one inner wall surface than to the other inner wall surface, wherein the center of the pinion is positioned at the center between the one inner wall surface and the other inner wall surface in the direction of the circumference; and
   the pinion is disposed with respect to the carrier so that a space is formed between each of the inner wall surfaces and the outer peripheral surface of the pinion so as to allow the pinion to slide along the radial direction of the carrier.

2. A vehicle planetary gear device comprising:
   an internal helical ring gear;
   an external helical sun gear disposed inside the ring gear so that an axis of the sun gear coincides with an axis of the ring gear;
   a carrier that is inserted between the ring gear and the sun gear so that an axis of the carrier coincides with the axis of the ring gear and the sun gear and that has a cylindrical portion provided with a penetration hole penetrating the cylindrical portion along a radial direction of the carrier; and
   an external helical pinion that is housed in the penetration hole of the carrier so as to be freely rotatable and slidable in an axis direction of the pinion and that meshes with the ring gear and the sun gear, wherein:
   the carrier has inner wall surfaces that face an outer peripheral surface of the pinion;
   each of the inner wall surfaces is provided with a flat surface portion, and a pair of curved surface portions that respectively extend in a radially outward direction and a radially inward direction of the carrier with respect to the flat surface portion;
   the flat surface portion is formed on the inner wall surface so that at least a portion of the flat surface portion intersects with a circumference whose center is an axis center of the cylindrical portion, and which passes through a center of a width between an inner peripheral surface of the cylindrical portion and an outer peripheral surface of the cylindrical portion in the radial direction, and at least the portion of the flat surface is parallel to a line that extends from a center between the inner wall surfaces in a direction of the circumference to the axis center of the cylindrical portion; and
   the pinion is disposed with respect to the carrier so that a space is formed between each of the inner wall surfaces and the outer peripheral surface of the pinion so as to allow the pinion to slide along the radial direction of the carrier.

3. The vehicle planetary gear device according to claim 2, wherein a center of a width of the flat surface coincides with a center between the inner peripheral surface of the cylindrical portion and the outer peripheral surface of the cylindrical portion in the radial direction.

* * * * *